Patented Oct. 10, 1950

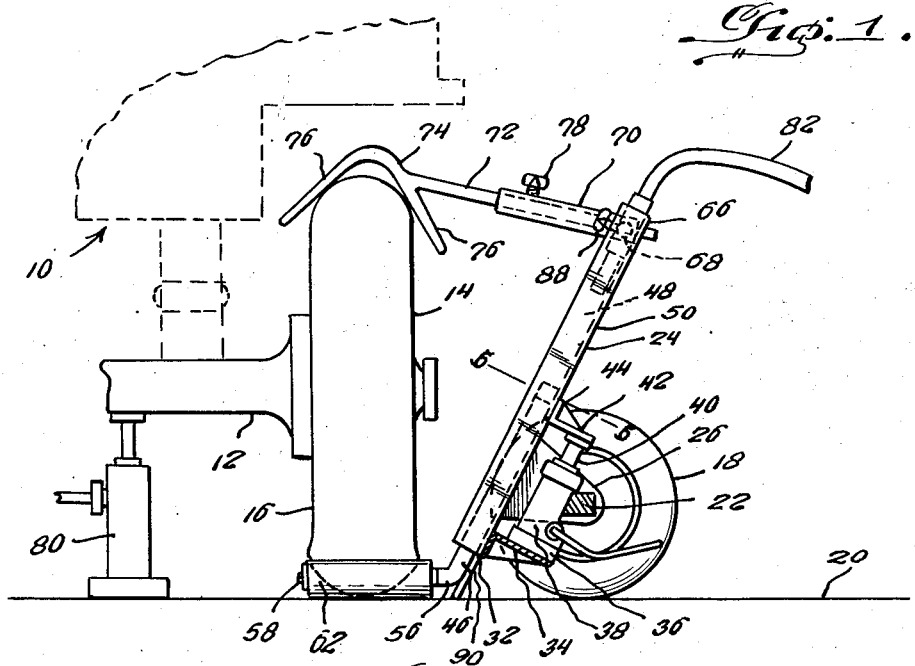
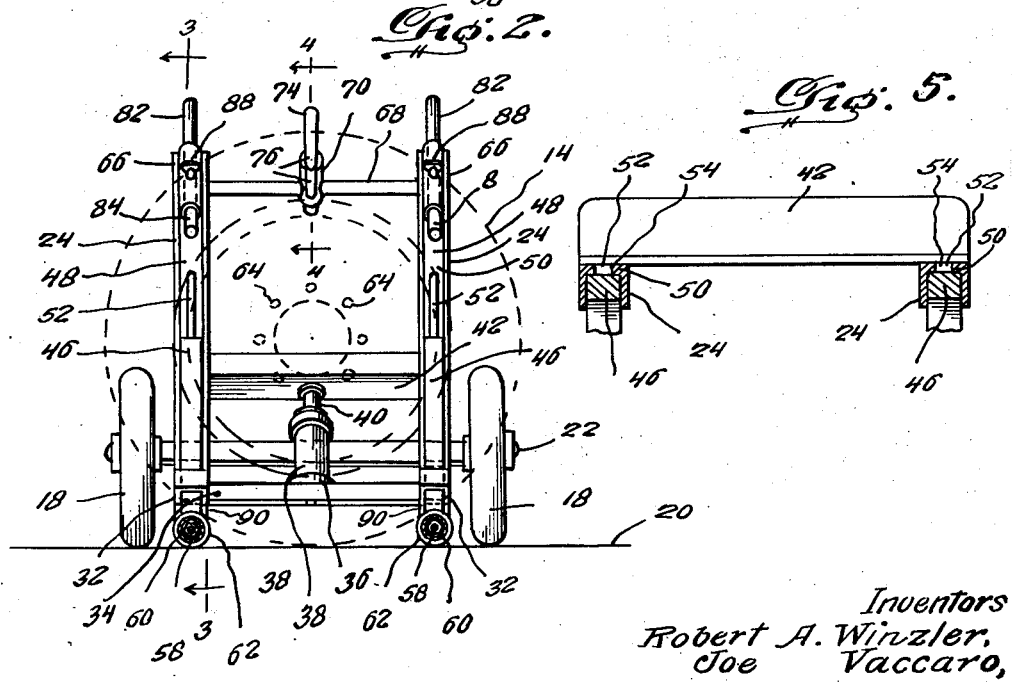

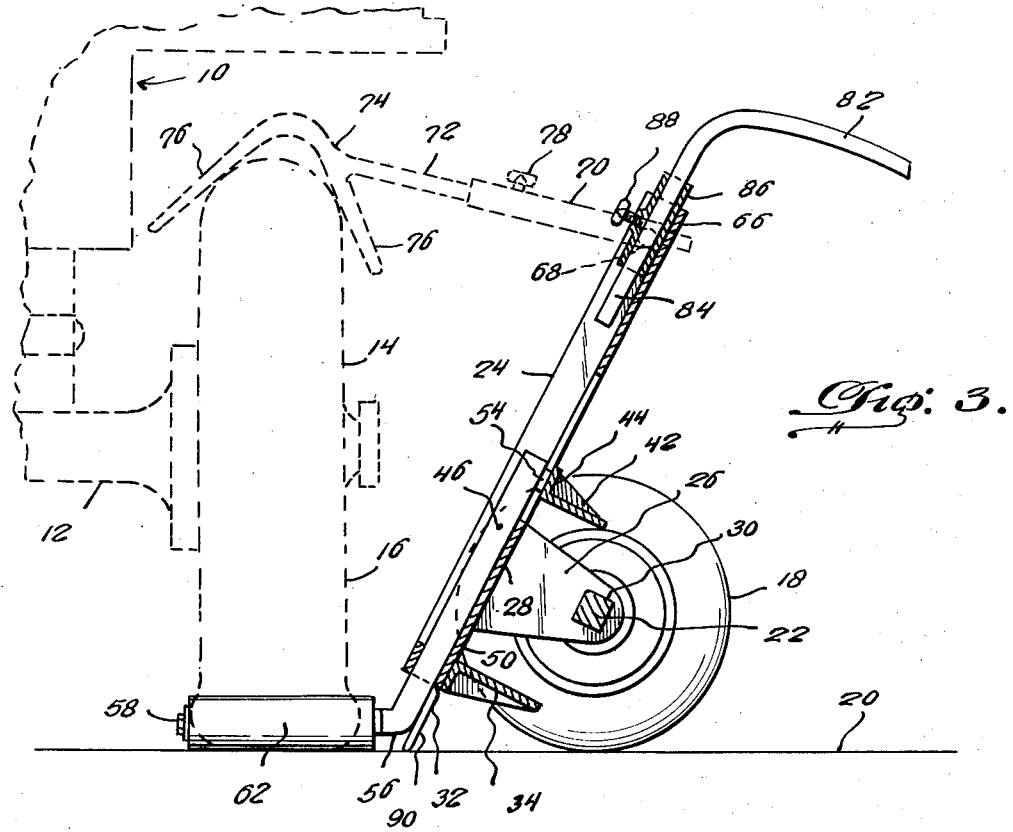
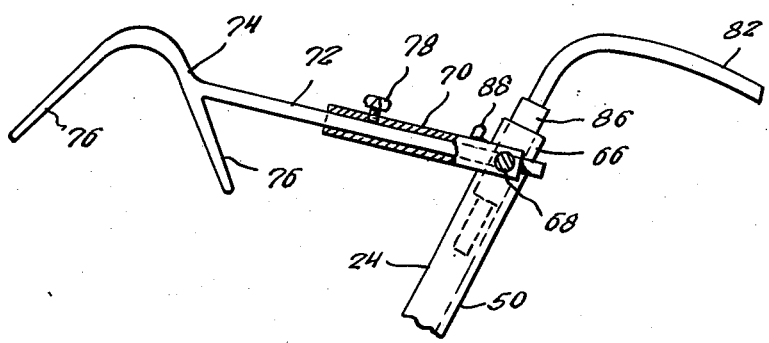

2,525,437

UNITED STATES PATENT OFFICE 2,525,437

WHEEL AND TIRE CHANGING DEVICE

Robert A. Winzler and Joe Vaccaro, Fresno, Calif.

Application November 19, 1946, Serial No. 710,894

2 Claims. (Cl. 214—65.4)

This invention relates to devices for handling tires and wheels to assist in installing and removing them on automobiles and trucks.

An object of the invention is to provide a device whereby a mechanic or driver of an automobile or truck can quickly and easily change a tire without assistance from another person.

Another object of the invention is to provide a tire handling device which includes a wheeled frame adapted for supporting a tire, and including means for elevating the tire into position for mounting upon an automobile or truck.

A further object of the invention is to provide a tire changing device which is simple in design, inexpensive to manufacture, and which is capable of handling tires of any size, including large truck tires, thereby dispensing with delays due to lack of assistance when the driver has tire trouble.

Other objects and advantages of the invention will become apparent from the following description of a preferred embodiment thereof as illustrated in the accompanying drawings, and in which, Figure 1 is a side elevation of our improved tire changing device in operative engagement with a tire on an automobile or truck, the view being partly sectioned for clarity of illustration, Figure 2 is an elevational view of the tire changing device as seen from the left side of Figure 1, Figure 3 is a sectional elevation taken on line 3—3 of Figure 2, Figure 4 is a sectional elevation taken on line 4—4 of Figure 2, and Figure 5 is a sectional view taken on line 5—5 of Figure 1.

In the use of motor vehicles, such as automobiles and trucks, it is frequently necessary to change a tire due to a puncture therein, and this is usually quite a nuisance and sometimes a difficult operation to perform. For example, women quite uniformly avoid even attempting to change a tire, while truck drivers when driving alone, are physically unable to install or remove the large size and heavy tires currently in use. Hence, in both cases, it is necessary to send for assistance. The present invention provides a solution to the problem, inasmuch as it is a piece of equipment intended for passenger cars and trucks, whereby one person can change the tire and wheel with ease.

Reference may now be had to the drawings, in which like reference characters denote similar parts throughout the several views. As shown, there is an automobile generally indicated at 10, having an axle 12 upon which is mounted a wheel 14 and tire 16. When the tire is flat, as in Figure 3, it is necessary to remove it and its wheel from the axle 12, and install a spare tire and wheel in order to enable the vehicle to proceed on its way.

For this purpose we provide a pair of wheels 18 resting upon the ground surface 20 and interconnected by means of an axle 22 journaled at its ends in the wheels as shown. Upright steel channels form two spaced supports or uprights 24 which are carried upon brackets 26 welded along their edges 28 to the support channels 24, and having apertures 30 formed in the other end portions of the brackets through which the axle 22 may extend, that portion of the axle which extends therethrough being rectangular in cross section to avoid rotation of the axle therein.

The channel support rails 24 are inter-connected at their lower ends 32 by means of an angle plate or shelf 34 upon which the base 36 of a hydraulic jack cylinder 38 may rest. The movable elevating plunger 40 of the jack bears against the undersurface of an upper angle plate or shelf 42 the flange 44 of which is connected at its ends to the upper end portions of two telescoping members or standards 46 which are slidable longitudinally in the channel 48 formed between the web and flanges of the channel support members 24. The web 50 has an elongated longitudinal slot 52 formed therein in each member 24 for the reception of a connecting stud or pin 54 extending through the slot and interconnecting the flange 44 near both ends with the movable telescoping members 46.

It is thus apparent that as the jack plunger 40 is elevated, it elevates the upper shelf plate 42, and hence elevates the telescoping members 46 which slide upwards in the channel 48. The members 46 have their lower ends 56 bent as in Figures 1 and 3, and rounded to form cylindrical bearing shafts 58 which are journaled in ball bearings 60 rotatably supporting cylinders or rollers 62 the axes of which are normally substantially parallel to the ground surface 20.

Hence, it is apparent that when the spaced rollers 62 are moved into position beneath a tire, as illustrated, and the jack 38 operated, the tire and wheel will be elevated to the desired height, namely sufficiently to bring the wheel center aperture in registry with the protruding end of the axle 12 so that the wheel may be placed upon the axle. Then the wheel may be rotated while resting upon the rollers 62 in order to bring its stud bolt holes 64 into registry with the corresponding holes on the brake housing on the end of the axle housing in order that the stud bolts may be inserted through the holes 64 and threaded into the brake housing holes to secure the wheel thereon in the usual manner.

The side rails 24 are interconnected near their upper ends 66 by means of a cross bar 68 having a tubular lateral extension 70 for the reception of the shank 72 of a substantially U-shaped tire holding clamp 74 secured to the shank 72 along one of its diverging legs 76. The clamp 74 is thus slidable in the tubular extension 70 to properly position the tire and hold it against toppling over as it rests upon the foot rollers 62. The divergency of the clamp legs 76 enables it to engage tires of varius sizes, and a set screw 78 is threaded through the wall of the tubular member 70 to bear against the shank 72 thus holding it against sliding once it has been positioned as desired. The tubular member 70 and the clamp 74 may be arranged to pivot upward on the shaft 68 as indicated by dotted lines in Figure 1, to permit it to be swung upward and downward to engage and disengage with the tire.

It will be understood of course, that our device is not intended to jack up the automobile itself, this being done in the usual manner by a jack 80, but instead, our device is intended to facilitate changing the tire and wheel as described, and to aid in transporting the wheel and tire upon the wheels 18. The device has handles 82 the lower ends 84 of which telescope into tubular sockets 86 extending into the upper ends of the side rails 24, being adjustable therein by means of set screws 88.

Although we have described a preferred embodiment of our invention in specific terms, it is to be understood that various changes may be made in size, shape, materials and arrangement without departing from the spirit and scope of the invention as claimed.

The channels 24 may be provided with downward extensions 90 forming legs to rest on the ground and support the device against tipping over when the rollers 62 are elevated above the ground.

We claim:

1. In a wheel and tire handling device comprising a pair of spaced uprights, a bracket arranged rearwardly of each of said uprights intermediate their ends and having one end fixedly secured thereto, a horizontally disposed axle arranged transversely of said brackets and fixedly supported therein, a wheel positioned on each end of said axle and rotatably supported thereon, a standard positioned within each of said uprights and mounted for up and down movement, a horizontally disposed rotatable roller arranged longitudinally of said standards and carried by each of the lower ends of said standards for engaging a tire at opposed points thereon, a transversely disposed shelf arranged below said brackets and fixedly secured to said uprights, a hydraulic jack including a reciprocating plunger positioned on said shelf and fixedly secured thereto, a second shelf positioned in parallel spaced relation with respect to the first shelf fixedly secured to said standards and engageable with the plunger of said hydraulic jack, a cross bar positioned between said uprights adjacent to and spaced from the upper end thereof and fixedly secured thereto, and a longitudinally extending clamp having one end adapted for engagement with the tire and having its other end slidably connected to said cross bar.

2. In a wheel and tire changing device comprising a pair of spaced uprights, a pair of rotatable wheels arranged rearwardly of said uprights and supportingly connected to the latter, a standard positioned within each of said uprights and mounted for up and down movement, a horizontally disposed rotatable roller arranged longitudinally of said standards and carried by each of the lower ends of said standards for engaging a tire at opposed points thereon, a transversely disposed shelf arranged rearwardly of said uprights and between said wheels and fixedly secured to said uprights, a hydraulic jack including a reciprocatory plunger positioned on said shelf and fixedly secured thereto, a second shelf positioned in parallel spaced relation with respect to the first shelf fixedly secured to said standards and engageable with the plunger of said hydraulic jack, a cross bar positioned between said uprights adjacent to and spaced from the upper end thereof and fixedly secured thereto, and a longitudinally extending clamp having one end adapted for engagement with the tire and having its other end slidably connected to said cross bar.

ROBERT A. WINZLER.
JOE VACCARO.

REFERENCES CITED

The following references are of record in the file of this patent:

UNITED STATES PATENTS

| Number | Name | Date |
| --- | --- | --- |
| 1,640,297 | Rogers | Aug. 23, 1927 |
| 1,731,204 | Recchia | Oct. 8, 1929 |
| 1,964,119 | Hendry | June 26, 1934 |

FOREIGN PATENTS

| Number | Country | Date |
| --- | --- | --- |
| 474,605 | Great Britain | Apr. 28, 1936 |